United States Patent [19]
Seidel

[11] 3,722,711
[45] Mar. 27, 1973

[54] MACHINE TOOL
[75] Inventor: William B. Seidel, Cincinnati, Ohio
[73] Assignee: Cincinnati Milacron Inc., Cincinnati, Ohio
[22] Filed: Apr. 15, 1970
[21] Appl. No.: 28,742

[52] U.S. Cl. ................................214/1 BD, 294/97
[51] Int. Cl. .............................................B23q 5/32
[58] Field of Search ........................214/1 BD; 294/97

[56] References Cited

UNITED STATES PATENTS

| | | | |
|---|---|---|---|
| 3,608,188 | 9/1971 | Seidel | 29/568 |
| 3,492,717 | 2/1970 | Seidel | 29/568 |
| 3,579,812 | 5/1971 | Pfister | 29/568 |

*Primary Examiner*—Gerald M. Forlenza
*Assistant Examiner*—George F. Abraham
*Attorney*—Frank C. Leach, Jr.

[57] ABSTRACT

A pair of arms is employed to transfer tools between a tool storage mechanism and a spindle. The arms are independently pivoted on a rotating shaft, which rotates the arms between the spindle and the tool storage mechanism, so that the arm, which is supplying a tool to the tool storage mechanism, can be held in a parked position until a desired pocket in the tool storage mechanism is positioned to receive the tool. A unique gripping arrangement releasably connects the tool to the arm and requires only a simplified cooperating structure on a holder for the tool.

14 Claims, 13 Drawing Figures

Fig. 1

INVENTOR.
WILLIAM B. SEIDEL
BY FRANK C. LEACH JR.
ATTORNEY

MACHINE TOOL

In my copending patent application entitled "Machine Tool," Ser. No. 792,925, filed Jan. 22, 1969, now U.S. Pat. No. 3,608,188 and assigned to the same assignee as the assignee of the present application, there is shown a tool changing mechanism for a machine tool in which each tool is always stored in the same position in a tool storage means. The tool changing mechanism of my aforesaid application utilizes interchange arms, which are pivotally mounted on separate secondary shafts. The separate secondary shafts are connected to a main shaft, which rotates to change the positions of the arms relative to the spindle and the tool storage means. By mounting the arms for independent pivoting, the arm, which has a tool that is to be returned to the tool storage means, can be held in a parked position until the pocket in the tool storage means for the particular tool is moved to a tool change position.

In my aforesaid application, one of the secondary shafts is fixed to the main shaft, which rotates to change the position of the arms relative to the spindle and the tool storage means, while the other of the secondary shafts rotates relative to the main shaft during rotation of the main shaft. There also are cam means employed to enable one of the arms to pass above the other of the arms during changing of the positions of the arms relative to the spindle and the tool storage means.

The present invention is an improvement of my aforesaid application in that a simpler mounting arrangement for the arms and the shaft, which changes the positions of the arms relative to the spindle and tool storage means, is employed. In the present invention, the secondary shafts are eliminated, and the arms are mounted on the shaft, which rotates the arms between the spindle and the tool storage means, so that the angular relation between the arms is never changed during rotation of the shaft. Thus, while each of the arms may pivot to move a tool clamped thereto relative to the spindle or the tool storage means, there is never any change in the angular relation of the arms during rotation of the shaft as in my aforesaid application.

It is necessary that the tools be clamped to the interchange arms during movement of the tools between the tool storage means and the spindle. The present invention employs an improved gripping mechanism for clamping the tool to an arm of the interchanger.

In the present invention, the tool gripping mechanism includes an arrangement in which the tool gripping means is positively urged into locking engagement with the tool holder. This insures that there can be no inadvertent release of the tool from the arm to which it is clamped.

With the tool gripping mechanism of the present invention, it is not necessary to use an expensive cooperating arrangement on the tool holder. Instead, it is only necessary to form a continuous annular groove in each of two axially spaced flanges on the tool holder.

In the tool change mechanism of the present invention, the sequence of operation is such that no exterior signals are necessary during the changing of the tool between the spindle and the tool storage means. It is only necessary to supply a signal that the tool, which is to be moved from the tool storage means to the spindle, is at the tool change position. The remainder of the operation is automatic.

An object of this invention is to provide a machine tool with a tool interchanger having a simplified mounting arrangement for independently pivotal arms.

Another object of this invention is to provide a machine tool with a tool interchanger having a unique gripping mechanism for releasably connecting the tool to the arm of the interchanger.

Other objects of this invention will be readily perceived from the following description, claims, and drawings.

This invention relates to an interchanger for use with a machine tool having a rotatable spindle and tool storage means remote from the spindle. The interchanger includes a housing having a shaft rotatably mounted therein for rotation about its longitudinal axis with means to rotate the shaft between first and second positions. A pair of arms is mounted for rotation with the shaft by first mounting means, which maintains the arms at the same angular relation to each other during rotation of the shaft. Each of the arms, which has clamping means to releasably connect a tool thereto, is mounted on the first mounting means for movement relative thereto by second mounting means. First moving means moves one of the arms between first and second positions when the rotating means is in its first position to move a tool connected to the one arm into or out of the tool storage means and moves the other of the arms between the same first and second positions when the rotating means is in its second position to move a tool connected to the other arm into or out of the tool storage means. Second moving means moves the other arm between first and second positions when the rotating means is in its first position to move a tool connected to the other arm into or out of the spindle and moves the one arm between the same first and second positions when the rotating means is in its second position to move a tool connected to the one arm into or out of the spindle. Means controls movement of the first and second moving means.

This invention further relates to an interchanger for use with a machine tool having a rotatable spindle and tool storage means remote from the spindle. The interchanger includes a housing having a shaft rotatably mounted therein for rotation about its longitudinal axis with means to rotate the shaft between first and second positions. A pair of arms is mounted for rotation with the shaft by first mounting means. Each of the arms, which is mounted on the first mounting means by second mounting means for movement relative thereto to move tools into and out of the spindle and tool storage means, has clamping means to releasably connect a tool to the arm. The clamping means includes at least two gripping elements supported by each of the arms with means to mount one of the tool gripping means for disposition in a continuous annular groove in the surface of a flange of a tool to be gripped and at least one other of the tool gripping means for disposition in a continuous annular groove in another flange of the tool to be gripped with the flanges axially spaced from each other and the grooves being in the surfaces of the flanges closest to each other. The clamping means includes means to pivotally support only the one tool gripping means and means cooperating with the pivotally supporting means to pivot the one tool gripping means to cause the tool gripping means to move into the grooves when a tool is to be connected to the arm for movement therewith between the spindle and the tool change position when the shaft is rotated and out of the grooves when the connected tool is to be released for disposition in one of the spindle and the storage means. The clamping means also has resilient means to retain the one tool gripping means in the groove in which it is disposed. Means controls the movement of each of the arms with the cooperating means of the clamping means being movable by the control means when the tool gripping means are to be moved into and out of the grooves in coordination with movement of the arms by the control means.

The attached drawings illustrate a preferred embodiment of the invention, in which.

Figure 1:
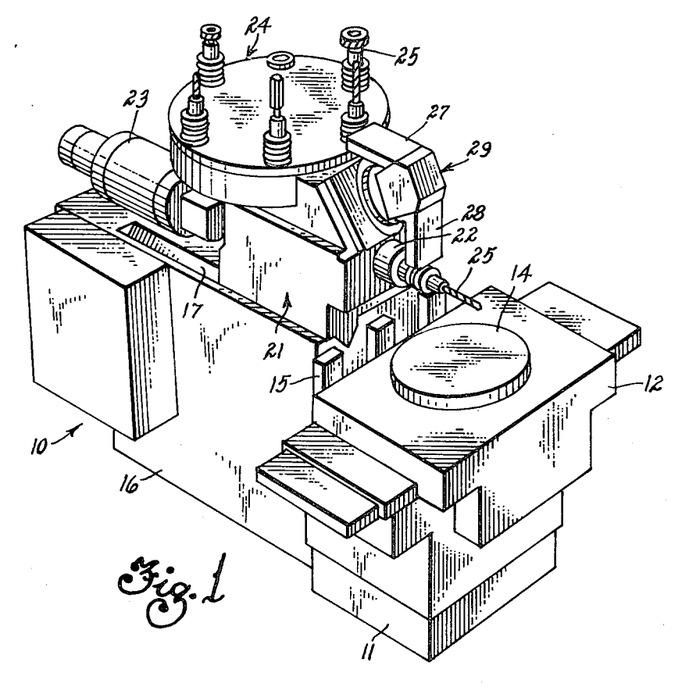
FIG. 1 is a perspective view of a machine tool utilizing the tool changing mechanism of the present invention.

Referring to the drawings and particularly FIG. 1, there is shown a machine tool 10 having a knee 11 on which a work table 12 is movable along parallel horizontal ways (not shown) on the knee 11 in the X direction. The work table 12 has a turn table 14 mounted therein for rotating the workpiece if desired.

The knee 11 is mounted for vertical movement on parallel ways 15 on a base 16 of the machine tool 10. Thus, the knee 11, which includes the work table 12, can be moved along the ways 15 in the Y direction by a motor (not shown).

The base 16 has parallel horizontally disposed ways 17 (one shown) on which a spindle carrier 21 is mounted for sliding movement toward and away from the work table 12 in the Z direction. A spindle 22 is rotatably mounted in the spindle carrier 21 and is rotated by a motor 23, which is carried by the spindle carrier 21.

The spindle carrier 21 has tool storage means such as a tool carrier 24, for example, supported thereon and carrying a plurality of tools 25 with each of the tools 25 having its axis substantially vertical. Each of the tools 25 is stored in a pocket or socket 26 (see FIG. 2) in the tool carrier 24.

Figure 2:
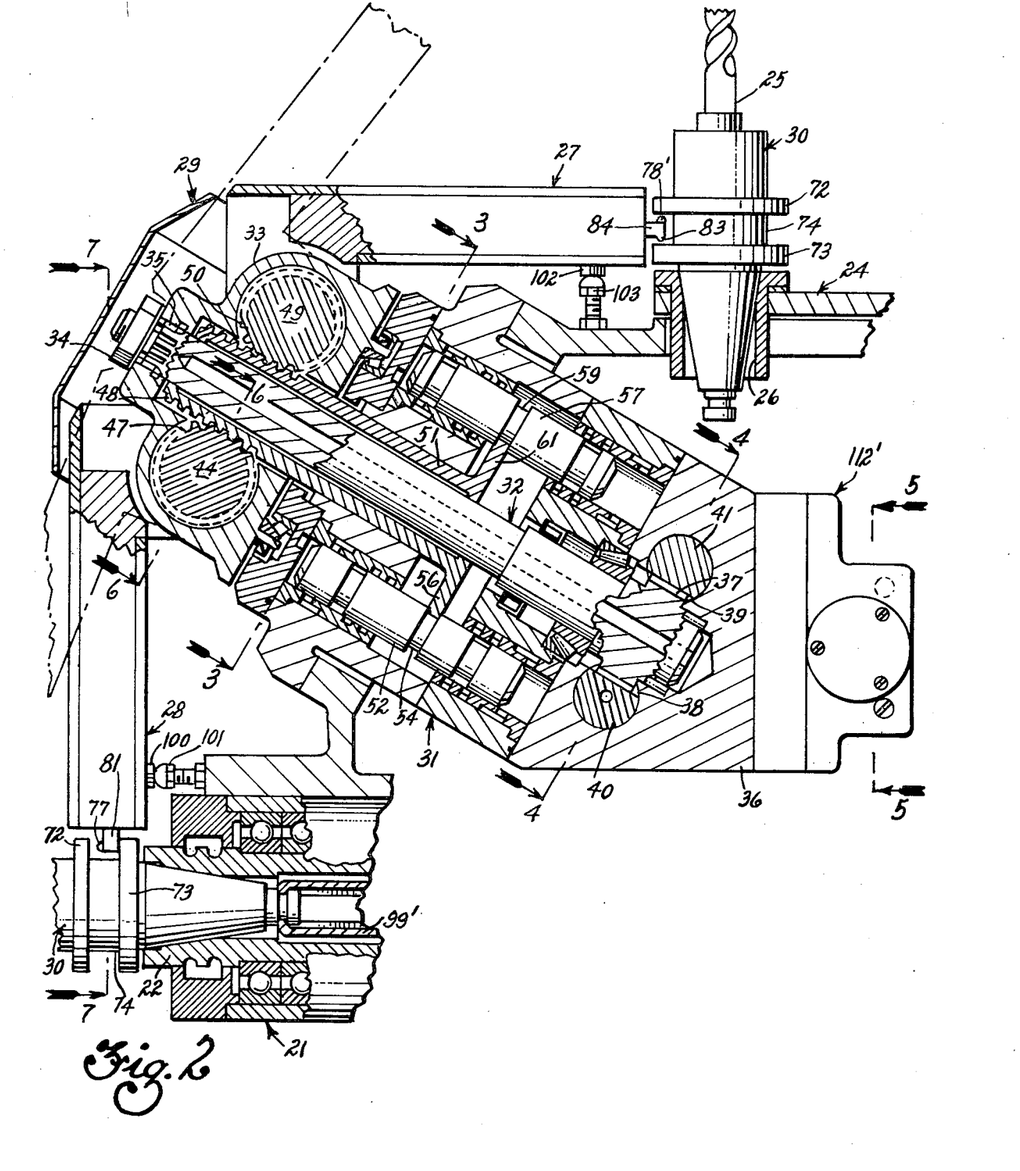
FIG. 2 is a sectional view, partly in elevation, of the tool changing mechanism of the present invention.

The tool carrier 24 is adapted to be driven by suitable means (not shown) to position each of the tools 25 at a tool change position at which the tool 25 may be removed from the pocket 26 by either of a pair of arms 27 and 28 of a tool interchanger 29. Each of the tools 25 is supported in a tool holder 30, which is disposed within the pocket 26 to support the tool 25 on the tool carrier 24.

The interchanger 29 includes a housing 31 having a shaft 32 mounted therein for rotation about its longitudinal axis. The longitudinal axis of the shaft 32 is disposed between the axis of the spindle 22 and the axis of the tool 25 that is disposed at the tool change position as shown in FIG. 2 and lies at a substantial angle to each of the axes.

One end of the shaft 32 has an index head 33 mounted thereon for rotation therewith. The head 33, which has the arms 27 and 28 pivotally mounted thereon, is retained on the end of the shaft by a nut 34. The shaft 32 and the head 33 have cooperating splines 35 to rotate the head 33 with the shaft 32 whereby the arms 27 and 28 rotate with the shaft 32 and maintain the same angular relation to each other during rotation of the shaft 32.

The shaft 32 has its end, which is remote from the head 33, supported in a mounting block 36, which is fixed to the housing 31 and may be considered a part thereof. This end of the shaft 32 has a gear 37 formed thereon and integral therewith for cooperation with the teeth of racks 38 and 39 (see FIG. 4) of rack pistons 40 and 41, respectively.

When the rack pistons 40 and 41 are simultaneously moved in opposite directions, the gear 37 is rotated. However, only one of the rack pistons 40 and 41 is driven through having fluid pressure applied thereto by being applied to its left end in FIG. 4; the other of the rack pistons 40 and 41 has fluid pressure exhausted from its left end at this time.

Figure 4:
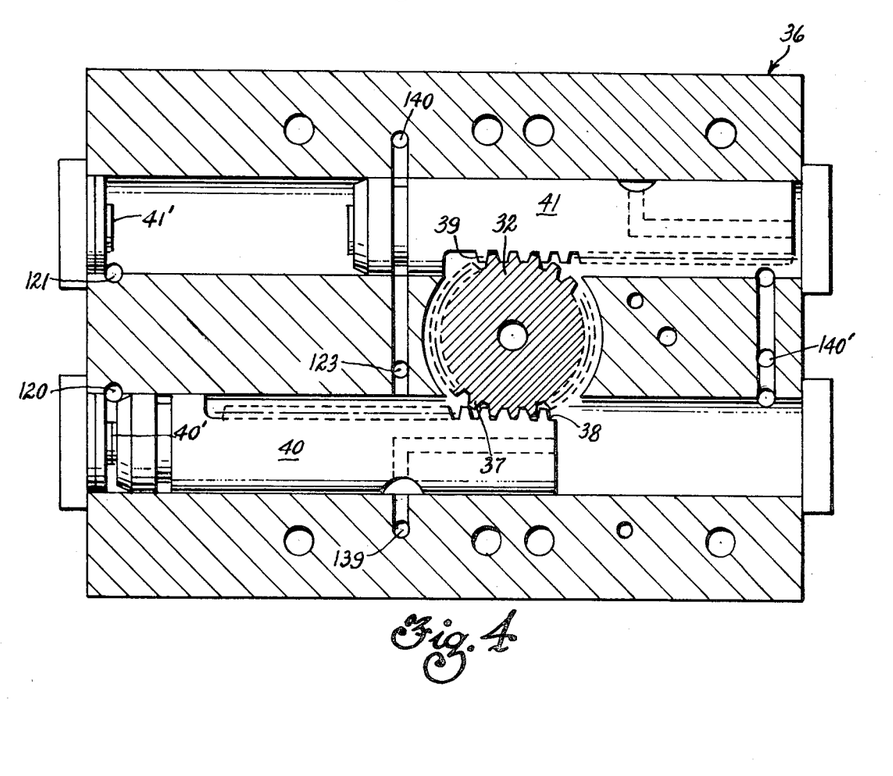
FIG. 4 is a sectional view of a shaft rotating mechanism of the tool changing mechanism of the present invention and taken along line 4—4 of FIG. 2.

Thus, when the rack piston 40 is moved to the right and the rack piston 41 is moved to the left in FIG. 4, the gear 37 is rotated counterclockwise to rotate the shaft 32. The linear movement of the rack pistons 40 and 41 is controlled so that the shaft 32 rotates 180° when the pistons 40 and 41 are moved from one of their extreme positions to the other and vice versa.

The control of the linear movement of the rack pistons 40 and 41 is accomplished by mechanical stops 40' and 41' in the mounting block 36. Thus, when the rack piston 40 is moved to the right and the rack piston 41 is moved to the left in FIG. 4, the linear movement is stopped when the rack piston 41 engages the stop 41'. When there is movement of the rack pistons in the opposite direction, the linear movement is stopped by the rack piston 40 engaging the stop 40' as shown in FIG. 4.

Figures 6, 7, 8, 9, 10, 11:
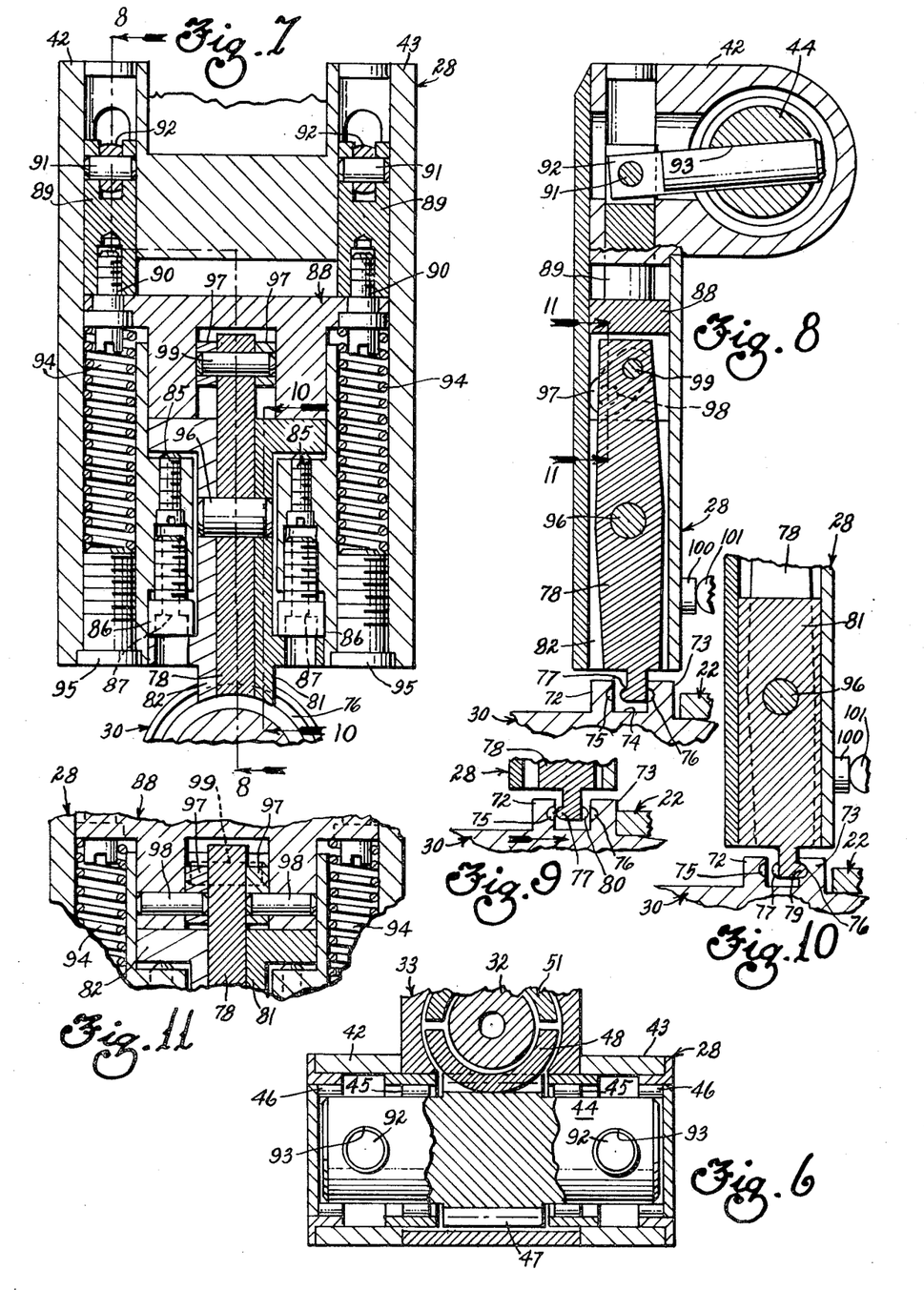
FIG. 6 is a sectional view, partly in elevation, of a pivotal mounting arrangement for one of the arms of the tool changing mechanism and taken along line 6-6 of FIG. 2.
FIG. 7 is a sectional view, partly in elevation, of one of the arms of the tool changing mechanism of the present invention including a clamping mechanism for gripping a tool and taken along line 7—7 of FIG. 2.
FIG. 8 is a sectional view, partly in elevation, of the arm of FIG. 7 and taken along line 8—8 of FIG. 7.
FIG. 9 is a fragmentary sectional view, partly in elevation, of the lower portion of FIG. 8, and showing the gripping fingers of the tool clamping mechanism of one of the arms in the position in which the tool is released from the gripping fingers.
FIG. 10 is a fragmentary sectional view, partly in elevation, of a portion of the arm of FIG. 7 and taken along line 10—10 of FIG. 7.
FIG. 11 is a fragmentary sectional view of a portion of the arm of FIG. 7 and taken along line 11—11 of FIG. 8.

As previously mentioned, each of the arms 27 and 28 is pivotally mounted on the index head 33. Referring to FIG. 6, the pivotal mounting of the arm 28 on the index head 33 is shown. One end of the arm 28 terminates in a pair of bifurcated end portions 42 and 43, which are disposed on opposite sides of the index head 33.

The arm 28 has a shaft 44 rotatably mounted within the bifurcated end portions 42 and 43. The shaft 44, which is rotatably mounted in the index head 33 by needle bearings 45, is rotatably supported within the arm 28 by needle bearings 46. Accordingly, the arm 28 is mounted for pivotal movement relative to the index head 33.

Figure 3:
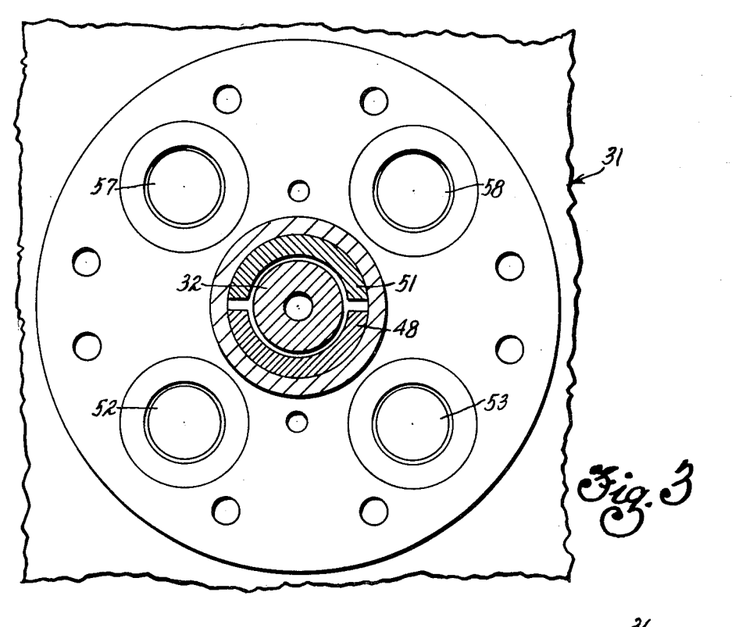
FIG. 3 is an elevational view, partly in section, of a portion of the tool changing mechanism of FIG. 2 and taken along line 3—3 of FIG. 2.

The central portion of the shaft 44 has a gear 47 formed integral therewith for meshing with teeth on a rack 48. The rack 48 is substantially semicircular in cross section and surrounds a semicircular portion of the shaft 32 as shown in FIGS. 3 and 6. Because of the cooperation between the teeth of the rack 48 and the teeth of the gear 47, the rack 48 cannot rotate relative to the shaft 32.

The arm 27 is similarly mounted on the index head 33 so that a shaft 49 (see FIG. 2), which is rotatably supported within the bifurcated end portions of the arm 27, also is rotatably mounted within the index head 33 in the same manner as the shaft 44. Thus, the arm 27 is pivotally mounted on the index head 33 in the same manner as the arm 28 but on the opposite side of the shaft 32.

Furthermore, the shaft 49 has a gear 50 formed integral therewith in the same manner as the gear 47 is integral with the shaft 44. The gear 50 has teeth meshing with teeth on a rack 51, which is substantially semicircular in cross section and surrounds a substantially semicircular portion of the shaft 32 as shown in FIGS. 3 and 6.

The positions of the racks 48 and 51 are controlled independently of the shaft 32. The positions of the racks 48 and 51 also can be controlled independently of each other.

When the rack 48 is in the position of FIG. 2, the rack 48 has its movement controlled by a pair of pistons 52 and 53 (see FIGS. 3 and 13), which are slidably mounted in the housing 31. The pistons 52 and 53 have annular grooves 54 and 55 (see FIG. 13), respectively, therein to receive a flange 56 (see FIG. 2) on one end of the rack 48 when the racks 48 and 51 are in the position of FIG. 2. Accordingly, as the pistons 52 and 53 are moved downwardly in FIGS. 2 and 13, the shaft 44 is rotated clockwise (as viewed in FIG. 2) about its axis, which is parallel to the axis of the shaft 49, to pivot the arm 28 away from the spindle carrier 21.

When the rack 51 is in the position of FIG. 2, the movement of the rack 51 is controlled by a pair of pistons 57 and 58 (see FIGS. 3 and 13), which are slidably mounted in the housing 31. The pistons 57 and 58 have annular grooves 59 and 60 (see FIG. 13), respectively, therein to receive a flange 61 (see FIG. 2) on one end of the rack 51 when the racks 48 and 51 are in the position of FIG. 2. Accordingly, when the pistons 57 and 58 are moved downwardly, the rack 51 is moved downwardly to cause counterclockwise (as viewed in FIG. 2) rotation of the shaft 49 about its axis, which is on the opposite side of the shaft 32 from the axis of the shaft 44, whereby the arm 27 is pivoted away from the tool carrier 24.

When the index head 33 is rotated by the shaft 32 to transpose the positions of the arms 27 and 28 from that of FIG. 2, the flange 56 of the rack 48 is disposed in the annular grooves 59 and 60 of the pistons 57 and 58, respectively, and the flange 61 of the rack 51 is disposed in the annular grooves 54 and 55 of the pistons 52 and 53, respectively. Then, when the positions of the racks 48 and 51 have been transposed from that of FIG. 2, they are controlled by the opposite sets of pistons. Accordingly, the pistons 52 and 53 always control the arm, which moves one of the tools 25 into and out of the spindle 22, while the pistons 57 and 58 always control the arm, which moves one of the tools 25 into and out of one of the pockets 26 in the tool carrier 24.

The length of the stroke of the pistons 57 and 58 is substantially greater than the length of the stroke of the pistons 52 and 53. As an example, the pistons 52 and 53 move 0.677 inch while the pistons 57 and 58 move 1.331 inches or slightly less than twice the stroke length of the pistons 52 and 53.

This difference in the length of the strokes of the pistons is necessary because of the location of the longitudinal axis of the shaft 32 with respect to the axis of the spindle 22 and the axis of the tool 25 in the pocket 26, which is disposed at the tool change position of FIG. 2. Thus, the longer stroke of the pistons 57 and 58 results in a greater angle of pivoting of the arm 27 or 28, which is cooperating with the pocket 26. This is shown in FIG. 2 when comparing the solid line and phantom line positions of each of the arms 27 and 28.

The piston 52 is slidably mounted within a sleeve 62 (see FIG. 13) in the upper portion of the housing 31 and a sleeve 63 in the lower portion of the housing 31. The piston 53 is slidably mounted in a sleeve 64 in the upper portion of the housing 31 and a sleeve 65 in the lower portion thereof.

Figure 13:
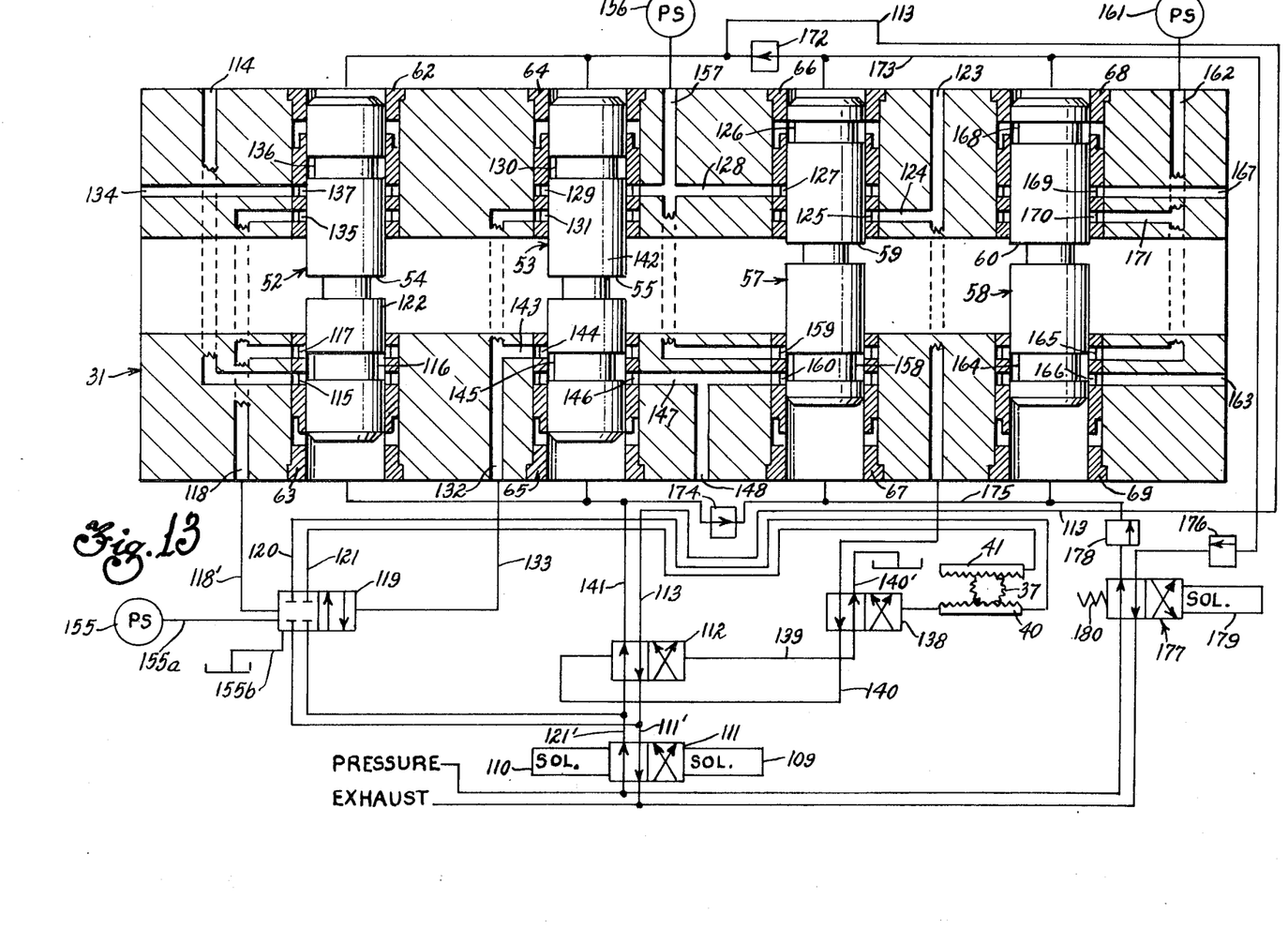
FIG. 13 is a schematic diagram of a hydraulic system for controlling the movements of the tool changing mechanism of the present invention.

The piston 57 is slidably mounted in a sleeve 66 in the upper portion of the housing 31 and a sleeve 67 in the lower portion of the housing 31. The piston 58 is slidably mounted in a sleeve 68 in the upper portion of the housing 31 and a sleeve 69 in the lower portion of the housing 31.

Accordingly, linear movement of the pistons 40 and 41 in the mounting block 36 controls rotation of the index head 33 and the connected arms 27 and 28 while linear movement of the pistons 52 and 53 in the housing 31 controls pivoting of one of the arms 27 and 28 and linear movement of the pistons 57 and 58 in the housing 31 controls pivoting of the other of the arms 27 and 28. Thus, through proper control of the flow of the hydraulic fluid, indexing of the head 33 by rotating the head 33 and pivoting of the arms 27 and 28 may be controlled in the desired sequence.

Each of the arms 27 and 28 has means to clamp the tool 25 to the arm when the tool 25 is removed from either the spindle 22 or one of the pockets 26 in the tool carrier 24 and transferred to the other. Each of the tool holders 30, which may be considered as part of the tool along with the tool 25, has a pair of flanges 72 and 73 (see FIG. 2) formed thereon and axially or longitudinally spaced from each other to form a clearance groove 74 therebetween.

The surface of the flange 72 closest to the flange 73 has a continuous annular groove 75 (see FIGS. 8 to 10) formed therein. The surface of the flange 73 closest to the flange 72 has a continuous annular groove 76 formed therein.

The groove 75 in the flange 72 of the tool holder 30 receives middle or center tool grip 77 of a middle finger 78 of the arm 28 or middle or center tool grip 78' (see FIG. 2) of a middle finger of the arm 27. The groove 76 in the flange 73 receives outer tool grips 79 and 80 of outer fingers 81 and 82 of the arm 28 or similar outer tool grips (one shown at 83 in FIG. 2) of outer fingers (one shown at 84 in FIG. 2) of the arm 27. The outer fingers 81 and 82 are disposed on opposite sides of the middle finger 78 as shown in FIG. 7.

Figure 12:
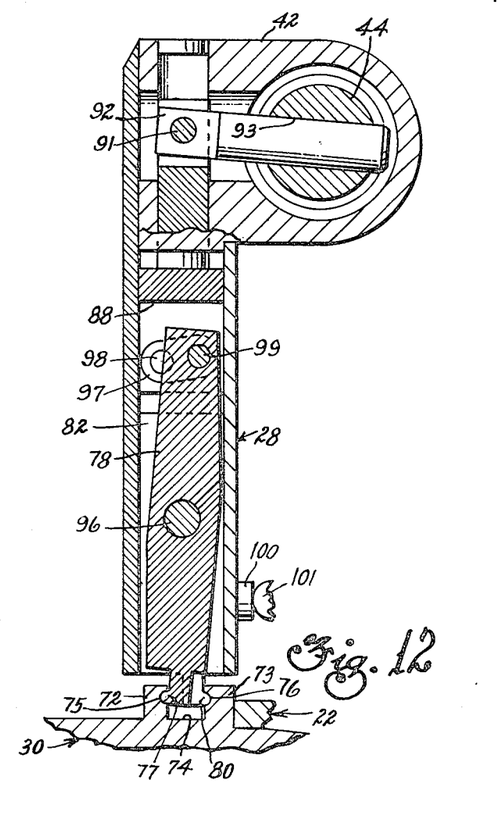
FIG. 12 is a sectional view, partly in elevation, similar to FIG. 8, but showing the gripping fingers of the clamping mechanism gripping a tool to connect the tool to the arm.

Accordingly, whenever the inner and outer tool grips of one of the arms 27 and 28 are disposed within the grooves 75 and 76 in the flanges 72 and 73 as shown in FIG. 12 for the arm 28, the tool holder 30 and the tool 25 are clamped by the clamping mechanism on the arm and connected thereto for movement therewith.

Each of the outer fingers 81 and 82 of the arm 28 is adjustably supported within the arm 28 as shown in FIG. 7. A pair of adjusting screws 85 and 86, which are disposed in the arm 28, cooperates with each of the outer fingers 81 and 82 to position the tool grips 79 and 80, respectively, with respect to the axis of the spindle 22. Thus, rotation of the screws 85 and 86 separately in one direction advances the tool grip of the cooperating finger away from the axis of the spindle 22 while rotation separately in the opposite direction advances the tool grip of the finger toward the axis of the spindle 22. Each of the adjusting screws 86 has a longitudinal passage 87 extending therethrough to allow a screw driver to be inserted therethrough to change the position of the screw 85.

The upper end of each of the outer fingers 81 and 82 bears against a plunger 88, which has a pair of plunger shafts 89 connected thereto by screws 90 and extending therefrom, when the plunger 88 is in the position of FIG. 7. Each of the plunger shafts 89 is connected by a pin 91 to a plunger shaft 92, which extends through a bore 93 in the shaft 44.

A pair of springs 94, which are mounted in the arm 28 and retained therein by cooperating plugs 95, continuously urges the plunger 88 away from the fingers 78, 81, and 82. When the plunger 88 is moved to the position of FIG. 12 by clockwise rotation of the shaft 44, the force of the springs 94 is transmitted through the plunger 88 to the middle finger 78 to exert a force on the tool grip 77 to insure that the tool holder 30 is clamped to the arm 28.

The movement of the plunger 88 toward the fingers 78, 81, and 82 causes the middle finger 78 of the arm 28 to pivot counterclockwise (as viewed in FIG. 8) so that the tool grip 77 of the finger 78 is moved out of engagement with the groove 75 in the flange 72; this is when the arm 28 moves toward the spindle 22. The movement of the plunger 88 away from the fingers 78, 80, and 81 causes the middle finger 78 to pivot clockwise (as viewed in FIG. 8) to move the grip 77 into the groove 75; this is when the arm 28 moves away from the spindle 22.

The movement of the plunger 88 is transmitted to the middle finger 78, which is pivotally mounted on a pin 96 extending into bores in the outer fingers 81 and 82, by two links 97. Each of the links 97 is connected to the plunger 88 by a pin 98 (see FIGS. 8 and 11). The links 97 are connected to the adjacent end of the middle finger 78 by a pin 99.

Accordingly, when the plunger 88 is moved toward the fingers 78, 81, and 82 against the force of the springs 94 due to counterclockwise (as viewed in FIG. 8) rotation of the shaft 44, the middle finger 78 is pivoted counterclockwise (as viewed in FIG. 8) about the pin 96. This withdraws the tool grip 77 from the groove 75 in the flange 72 of the tool holder 30.

When the plunger 88 moves away from the fingers 78, 81, and 82 due to clockwise (as viewed in FIG. 8) rotation of the shaft 44, the middle finger 78 is pivoted clockwise (as viewed in FIG. 8) about the pin 96. This causes the tool grip 77 to engage within the groove 75 in the flange 72 of the tool holder 30. At this time, the springs 94 exert their full force to retain the tool grip 77 in the groove 75.

The arm 27 is similarly constructed insofar as the operation of the various gripping fingers are concerned. Accordingly, the details are not shown and will not be described.

It should be understood that the machine tool 10 may be provided with a numerical control apparatus to provide for movement of the table 12 along the ways of the knee 11, movement of the knee 11 along the ways 15, movement of the spindle carrier 21 along the ways 17, and rotation of the spindle 22 by the motor 23. The numerical control apparatus also controls the speed of rotation of the spindle 22 and the interchange of the tools 25 from the tool carrier 24 to the spindle 22 and vice versa. Of course, the operations could be manually controlled if desired.

Considering the operation of the present invention with the apparatus in the position of FIG. 2 and the tools 25 to be inserted in sequence from the tool carrier 24 to the spindle 22, the tool holder 30 is about to be drawn into the spindle 22 by a drawbar 99' in the spindle carrier 21 in the well-known manner. At this time, the tool grip 77 of the middle finger 78 has ceased to be disposed in the groove 75 in the flange 72 and is spaced therefrom.

The arm 28 has reached the position of FIG. 2 in which a projection 100 on the arm 28 is engaging a stop 101 on the spindle carrier 21 adjacent the spindle 22 by counterclockwise rotation of the shaft 44. When the projection 100 on the arm 28 engages the stop 101, further pivoting of the arm 28 stops but the shaft 44 continues to rotate counterclockwise because the pistons 52 and 53 have not completed their upward movement. Therefore, as the shaft 44 continues to rotate counterclockwise due to the upward movement of the pistons 52 and 53, the middle finger 78 is pivoted counterclockwise about the pin 96 to withdraw the tool grip 77 from the groove 75 in the flange 72.

When the drawbar 99' in the spindle carrier 21 pulls the tool holder 30 into the spindle 22, the position of the tool grips 77, 79, and 80 with respect to the flanges 72 and 73 of the tool holder 30 is shown in FIG. 9. The movement of the tool holder 30 by the drawbar 99' is indicated by the arrow in FIG. 9. In this position, there is a running clearance between the tool grip 77 and the adjacent flange 72 and between the tool grips 79 and 80 and the adjacent flange 73.

Likewise, when the tool holder 30 has been disposed within the pocket 26 of the tool carrier 24, the grips of the arm 27 are spaced from the flanges 72 and 73 of the tool holder 30. This enables the tool carrier 24 to be rotated to present another of the tools 25 at the position at which the clamping means of the arm 27 can grip the tool holder 30 for removal of the tool 25 from the pocket 26.

It should be understood that the arm 27 reached the position in which a projection 102 on the arm 27 engages a stop 103, which is supported by the spindle carrier 21 adjacent the tool carrier 24, by clockwise rotation of the shaft 49 due to upward movement of the pistons 57 and 58. When the projection 102 engages the stop 103, further pivoting of the arm 27 ceases. However, the pistons 57 and 58 have not completed their upward movement so that the shaft 49 continues to rotate clockwise.

As a result, the middle finger of the arm 27 is pivoted in the same manner as the middle finger 78 of the arm 28 whereby the tool holder 30 is lowered into the pocket 26 beyond the position shown in FIG. 2. As a result of this further lowering of the tool holder 30 into the pocket 26, the outer tool grips (one shown at 83) of the arm 27 cease to be disposed in the continuous groove 76 in the flange 73. Thus, the center tool grip 78' of the arm 27 remains in the groove 75 of the flange 72 during initial pivoting of the middle finger. The lowering of the tool holder 30 into the pocket 26 of the tool carrier 24 is controlled by the design of the pocket 26 so that the downward movement of the tool holder 30 is sufficient that the outer grips (one shown at 83) of the arm 27 have a clearance with respect to the adjacent flange 73 having the groove 76.

Pivoting of the middle finger of the arm 27 continues until the plunger of the arm 27 engages against the outer fingers in the same manner as shown for the plunger 88 of the arm 28 in FIG. 7. When the middle finger has pivoted to this extent, the outer tool grip 78' is no longer disposed in the groove 75 of the flange 72 but has a clearance therewith. This clearance is the same as shown in FIG. 9 for one of the tool holders 30 supported within the spindle 22. This arrangement enables the tool carrier 24 to be driven to position another of the tools 25 and the work holder 30 at the position in which the clamping means of the arm 27 can grip the flanges of the tool holder 30.

Accordingly, when the tool 25 in the spindle 22 is to be replaced and another of the tools 25 is to be substituted therefor, the drawbar 99' in the spindle carrier 21 releases the tool holder 30 and returns it to the position of FIG. 2. At this time, the desired tool, which is to be moved from the tool carrier 24 to the spindle 22, is disposed in the position of FIG. 2 for grasping by the arm 27.

It is then necessary to energize a solenoid 109 (see FIG. 13) and de-energize a solenoid 110 to start the operation of the interchanger 29 to transfer the tool within the spindle 22 to the tool carrier 24 and the tool within the tool carrier 24 to the spindle 22. In this sequential operation, it should be understood that the pocket 26 from which the tool is removed by the arm 27 is the same pocket to which the tool in the spindle 22 is to be transmitted by the arm 28.

Figure 5:
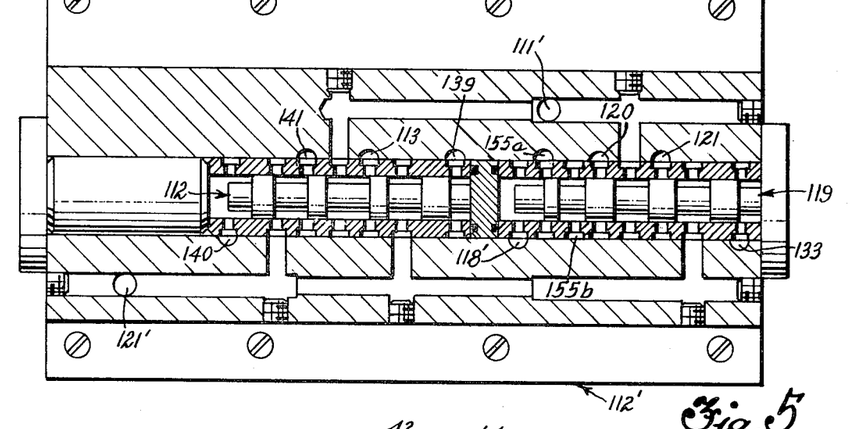
FIG. 5 is a sectional view, partly in elevation, of hydraulic spool valves for controlling various operations of the tool changing mechanism of the present invention and taken along line 5—5 of FIG. 2.

When the solenoid 109 is energized, a valve 111 is moved to the left from the position of FIG. 13 to reverse the flow from that shown in FIG. 13 from the pressure and exhaust sides of the fluid source, which supplies pressure at about 500 p.s.i. The pressurized fluid flows from the valve 111 through a line 111', a spool valve 112, which is in a core plate 112' (see FIGS. 2 and 5), and a line 113 to act on the upper surfaces of the pistons 52, 53, 57, and 58 to move all of the pistons 52, 53, 57, and 58 downwardly.

The downward movement of the pistons 52 and 53 causes the rack 48 to move downwardly to produce clockwise rotation of the shaft 44. The downward movement of the pistons 57 and 58 results in the rack 51 moving downwardly to cause counterclock-wise rotation of the shaft 49.

When the shaft 44 rotates clockwise, it initially causes the middle finger 78 to pivot clockwise about the pin 96 from the position of FIG. 4 to the position of FIG. 12. The clockwise rotation of the shaft 44 moves the plunger 88 away from the fingers 78, 81, and 82. This movement of the plunger 88 carries the pins 98 therewith whereby the links 97 move from the position of FIG. 8 to the position of FIG. 12 to cause clockwise pivoting of the middle finger 78 about the pin 96. This movement of the plunger 88 also allows the springs 94 to exert their full force on the middle finger 78.

When the middle finger 78 pivots to the position of FIG. 12, the tool grip 77 engages in the groove 75 of the flange 72 and is held therein by the force of the springs 94. The outward movement of the tool holder 30 due to release of the tool holder 30 by the drawbar 99' in the spindle carrier 21 causes the flange 73 to be positioned so that the groove 76 therein receives the tool grips 79 and 80 of the outer flanges 81 and 82, which are stationary with respect to the arm 28.

Accordingly, the initial clockwise rotation of the shaft 44 causes the middle finger 78 to pivot about the pin 96 so that the tool grip 77 is disposed in the groove 75 as shown in FIG. 12. With the springs 94 exerting a force on the middle finger 78 through the plunger 88, the tool holder 30 is clamped to the arm 28 by the tool grips 77, 79, and 80.

In the initial counterclockwise rotation of the shaft 49, the middle tool grip 78' of the arm 27 initially engages in the groove 75 in the flange 72 to lift the tool holder 30 out of the pocket 26. As the tool holder 30 is lifted out of the pocket 26, the outer tool grips (one shown at 83) of the arm 27 are engaged in the groove 76 in the flange 73 by the time that pivoting of the middle finger of the arm 27 is completed. This locks the tool holder 30, which is in the pocket 26 in the tool carrier 24, to the arm 27.

When the pistons 52, 53, 57, and 58 are in the position of FIG. 13 prior to energization of the solenoid 109, pilot pressure, which is about 100 p.s.i., is supplied through a passage 114 in the housing 31 to a passage 115 in the lower sleeve 63. Because of the position of a reduced portion 116 of the piston 52, the passage 115 communicates with a passage 117 in the lower sleeve 63 so that the pilot pressure can be supplied through a passage 118 and a line 118' to the left side of a spool valve 119, which is disposed in the core plate 112'. This holds the spool valve 119 in the position in which flow through one of lines 120 and 121 to the rack pistons 40 and 41, respectively, and exhaust through the other of the lines 120 and 121 is prevented.

As soon as the pistons 52 and 53 begin their downward movement, a land 122 on the piston 52 blocks the passage 117. This prevents further supply of pilot pressure to the left side of the spool valve 119.

When the pistons 52, 53, 57, and 58 complete their downward movement (Because of the comparative stroke lengths, the pistons 57 and 58 complete their downward movement later than the pistons 52 and 53.), pilot pressure, which also is supplied to a passage 123 in the housing 31, is supplied to the right side of the spool valve 119 from the passage 123. The pilot pressure is supplied from the passage 123 through a passage 124 in the housing 31 to a passage 125 in the upper sleeve 66. Because of the position of a reduced portion 126 of the piston 57, the passage 125 communicates with a passage 127 in the upper sleeve 66.

A passage 128 in the housing 31 connects the passage 127 with a passage 129 in the upper sleeve 64. Because of the position of a reduced portion 130 of the piston 53, the passage 129 is connected to a passage 131 in the upper sleeve 64. A passage 132 in the housing 31 extends from the passage 131 for connection to a line 133, which leads to the right side of the spool valve 119.

At the same time, pilot pressure is exhausted from the left side of the spool valve 119 to which it was initially supplied because the line 118 now communicates with an exhaust passage 134 in the housing 31. The communication between the passages 118 and 134 is from the passage 118 to a passage 135 in the upper sleeve 62. Because of the position of a reduced portion 136 of the piston 52, the passage 135 connects with a passage 137 in the upper sleeve 62. The passage 137 communicates with the exhaust passage 134.

When the spool valve 119 is moved to the position in which the supply fluid can be supplied from the line 111' through the line 120 to act on the piston 40 and exhausted through the line 121 and a line 121' to cease to act on the piston 41 to cause rotation of the shaft 32, pivoting of the arms 27 and 28 is completed. Therefore, this arrangement insures that there is no indexing of the arms 27 and 28 until they have completed pivoting to the phantom line positions of FIG. 2 in which the tools 25 are withdrawn from the spindle 22 and the pocket 26.

As previously mentioned, the pistons 52, 53, 57, and 58 have completed their downward movement when pilot pressure is supplied to the right side of the spool valve 119 from the passage 123 and exhausted from the left side of the spool valve 119. At this time, the groove 54 in the piston 52, the groove 55 in the piston 53, the groove 59 in the piston 57, and the groove 60 in the piston 58 are disposed in the same plane. Accordingly, the flange 61 of the rack 51 and the flange 56 of the rack 48 are disposed in the same plane at the time when the shaft 32 is rotated.

When rotation of the index head 33 by the shaft 32 is completed, the flange 61 of the rack 51 is disposed within the grooves 54 and 55 of the pistons 52 and 53, respectively, and the flange 56 of the rack 48 is disposed in the grooves 59 and 60 of the pistons 57 and 58, respectively. This results in the arm 27 now being controlled by the pistons 52 and 53 and the arm 28 controlled by the pistons 57 and 58.

The movement of the rack pistons 40 and 41 changes the position of a valve 138, which actually comprises a plurality of passages in the rack pistons 40 and 41 and in the mounting block 36 but is schematically shown as the single valve 138 in FIG. 13. This shifting of the position of the valve 138 does not occur until there is completion of rotation through 180° of the index head 33 due to the rotation of the shaft 32 whereby the arms 27 and 28 have transposed their positions.

When the valve 138 shifts to the left in FIG. 13, the passage 123, which has pilot pressure supplied thereto, is connected through a line 139 to shift the position of the spool valve 112 to the left from the position shown in FIG. 13. The shifting of the valve 138 connects the left side of the spool valve 112 to the pilot exhaust through a line 140 and a line 140'. When the spool valve 112 shifts its position to the left in FIG. 13, the supply pressure is supplied from the line 111' through a line 141 to the bottom surfaces of the pistons 52, 53, 57, and 58 to move them upwardly.

The upward movement of the pistons 52, 53, 57, and 58 causes rotation of the shafts 44 and 49 in the opposite directions to that which occur when the pistons 52, 53, 57, and 58 move downwardly. As a result, the arm 27 moves the tool 25, which it is holding, toward the spindle 22 while the arm 28 moves the tool 25, which it is holding, toward the pocket 26.

As the pistons 52, 53, 57, and 58 move upwardly, the supply of pilot pressure through the line 133 to act on the right side of the spool valve 119 is prevented by a land 142 on the piston 53 blocking communication between the passages 129 and 131 as shown in FIG. 13. When the upward movement of the pistons 52, 53, 57, and 58 is completed, the line 133 communicates through the passage 132 to the pilot exahust. This is accomplished through the passage 132 communicating through a passage 143 in the housing 31 with a passage 144 in the lower sleeve 65. Because of the position of a reduced portion 145 of the piston 53, the passage 144 communicates with a passage 146 in the lower sleeve 65; the passage 146 is connected to a passage 147 in the housing 31. The passage 147 is connected to the pilot exhaust through a passage 148 in the housing 31.

At the same time, pilot pressure is again supplied from the supply passage 114 to the passage 118 by means of the passage 115 in the lower sleeve 63, the reduced portion 116 of the piston 52, and the passage 117 in the lower sleeve 63. Thus, when the pistons 52 and 53 complete their upward movement, the spool valve 119 again moves to the position of FIG. 13 in which there is no further supply of pressure to one of the index pistons 40 and 41 and pressure exhaust from the other of the pistons 40 and 41 so that there can be no rotation of the shaft 32 during pivoting of the arms 27 and 28. Of course, the completion of the movement of the index pistons 40 and 41 before the upward movement of the pistons 52, 53, 57, and 58 insures that there can be no further movement in this direction of the shaft 32 because the index piston 41 is abutting against the mechanical stop 41'.

As the arms 27 and 28 complete their movement, the tool 25, which is supported on the arm 27, enters the spindle 22, while the tool 25, which is supported on the arm 28, enters the pocket 26. This is the opposite arrangement to that shown in FIG. 2, but the position of the arms 27 and 28 have been transposed due to rotation of the index head 33 through 180°.

Accordingly, as the tool enters the spindle 22, the projection 102 on the arm 27 engages the stop 101 on the spindle carrier 21. When this occurs, further pivotal movement of the arm 27 is prevented but the pistons 52 and 53, which now rotate the shaft 49, have not completed their upward movement.

Accordingly, this arrangement enables the middle finger of the arm 27 to be pivoted by the continued rotation of the shaft 49 to remove the tool grip 78' from engagement with the groove 75 in the flange 72. This occurs in the same manner as previously described for the arm 28 with the relationship being the same as that shown for the arm 28 in FIG. 2.

Then, the drawbar 99' pulls the tool holder 30 into the spindle 22 to produce a running clearance between the tool grips of the arm 27 and the flanges 72 and 73. This relationship is shown for the arm 28 in FIG. 9 and is the same for the arm 27.

When the projection 100 on the arm 28 engages the stop 103, further pivoting of the arm 28 by rotation of the shaft 44 is stopped. However, the shaft 44 continues to rotate to remove the tool grips 77, 80, and 81 from the grooves 75 and 76 in the manner previously described for the arm 27. This arrangement enables the tool carrier 24 to be driven to position another of the tools 25 and the tool holder 30 at the tool change position in which the clamping means of the arm 28 can grip the flanges of the tool holder 30.

When it is desired to remove the tool 25 from the spindle 22 and substitute another of the tools 25 therefor, the solenoid 110 must be energized and the solenoid 109 de-energized. This returns the valve 111 to the position shown in FIG. 13.

Since the valve 112 had been moved to the left by the previous indexing cycle due to the valve 138 being moved to the left because of the rack pistons 40 and 41 changing their positions, the movement of the valve 111 to the position of FIG. 13 results in fluid pressure being supplied from the line 121' to the line 113 to act on the upper surfaces of the pistons 52, 53, 57, and 58. This causes downward movement of the pistons 52, 53, 57, and 58 to cause pivoting of the arm 27 away from the spindle 22 and the arm 28 away from the tool carrier 24. Of course, it has been necessary for the drawbar 99' in the spindle carrier 21 to have released the tool holder 30 to the position of FIG. 2 prior to energization of the solenoid 110 and de-energization of the solenoid 109.

The initial rotation of the shaft 49 by the downward movement of the pistons 52 and 53 results in the middle finger of the arm 27 pivoting clockwise to move the tool grip 78' into engagement with the groove 75 in the flange 72. The outward movement of the tool holder 30 by the drawbar 99' resulted in the outer tool grips (one shown at 83) of the arm 27 engaging in the groove 76 in the flange 73. Thus, this initial rotation of the shaft 49 by the rack 51 insures that the tool holder 30 is clamped to the arm 27.

The initial rotation of the shaft 44 by the rack 48 due to the downward movement of the pistons 57 and 58 causes clockwise pivoting of the middle finger 78 of the arm 28 about the pin 96. This is because the plunger 88 is moved by rotation of the shaft 44.

The movement of the plunger 88 in response to the initial rotation of the shaft 44 changes the position of the links 97 from that of FIG. 8 to that of FIG. 12. As the middle finger 78 pivots, the middle tool grip 77 initially engages in the groove 75 in the flange 72. As pivoting of the middle finger 78 continues, the outer tool grips 79 and 80 of the outer fingers 81 and 82, respectively, are engaged in the groove 76 in the flange 73 due to the lifting of the tool holder 30 from the pocket 26 because of the force exerted on the flange 72 by the middle tool grip 77 of the middle finger 78.

By the time that the middle finger 78 has completed its pivotal movement, the tool grip 77 is disposed in the groove 75 in the flange 72 and the tool grips 79 and 80 are disposed in the groove 76 in the flange 73. The springs 94 exert their force to hold the tool grip 77 in the groove 75 so that the tool holder 30 is clamped to the arm 28.

The pistons 52, 53, 57, and 58 continue their downward movement until the arms 27 and 28 have been pivoted the desired amount. At the completion of the downward movement of the pistons 52, 53, 57, and 58, the passage 118 is again connected with the pilot exhaust passage 134 while the line 133 is again connected with the passage 123 to receive pilot pressure. Accordingly, the spool valve 119 is again shifted to the left in FIG. 13.

Because of the position of the valve 111 due to the solenoid 110 being energized, the fluid pressure is supplied through the line 121 to act on the piston 41 while it is exhausted through the line 120 to cease to act on the piston 40 when the spool valve 119 is shifted to the left in FIG. 13. Accordingly, the shaft 32 rotates in the opposite direction to that in which it rotated when the solenoid 109 was energized. Thus, the arm 28 is again positioned so that the tool 25, which is supported by the arm 28, may be disposed within the spindle 22 and the tool 25, which is supported by the arm 27, may be disposed within one of the pockets 26 in the tool carrier 24.

Upon completion of rotation of the shaft 32, the valve 138 is shifted to the right to be returned to the position shown in FIG. 13. This results in the pilot pressure being supplied from the passage 123 through the line 140 to the left side of the spool valve 112 and exhausted from the right side of the spool valve 112 through the line 139 and the line 140'. As a result, the spool valve 112 is moved to the right to the position of FIG. 13.

When the spool valve 112 is shifted to the position of FIG. 13, the fluid pressure is supplied through the line 141 to act on the lower surfaces of the pistons 52, 53, 57, and 58 while the upper surfaces of the pistons 52, 53, 57, and 58 have the fluid pressure exhausted therefrom through the line 113. This shifting of the spool valve 112 results in the pistons 52, 53, 57, and 58 moving upwardly to pivot the arms 27 and 28 from the phantom line positions of FIG. 2 to the solid line positions of FIG. 2.

Accordingly, the tool 25, which is carried by the arm 28, is moved into the spindle 22. Pivoting of the arm 28 by rotation of the shaft 44 ceases when the projection 100 on the arm 28 engages the stop 101. When this occurs, the arm 28 cannot rotate any further but the pistons 52 and 53, which now control the shaft 44, have not completed their upward movement. Accordingly, counterclockwise rotation of the shaft 44 continues.

As previously mentioned, this continued counterclockwise rotation of the shaft 44 withdraws the tool grip 77 of the middle finger 78 from the groove 75 in the flange 72. This is shown in FIG. 8 wherein the grip 77 is substantially removed from the flange 72.

At this time, the drawbar 99' in the spindle carrier 21 pulls the tool holder 30 into the spindle 22 to retain it therein. This moves the tool holder 30 to the position of FIG. 9 whereby there is a running clearance between the middle tool grip 77 and the flange 72 and the outer tool grips 79 and 80 and the flange 73.

The pivoting of the arm 27 is stopped when the projection 102 engages the stop 103. At this time, the upward movement of the pistons 57 and 58, which now control the rotation of the shaft 49, has not ceased. Therefore, the same type of continued rotation of the shaft 49 occurs as for the shaft 44.

As previously mentioned, this produces a clearance between the tool grips of the arm 27 and the flanges 72 and 73 of the tool holder 30 in the same manner as shown for the arm 28 in FIG. 9. This enables the tool carrier 24 to rotate to the tool change position another of the pockets 26 with the tool 25 therein that is to be next disposed within the spindle 22.

When the pistons 57 and 58 complete their upward movement (The pistons 52 and 53 finish their upward movement earlier because of the comparative stroke lengths), the line 133 (see FIG. 13) is connected to the pilot exhaust through the passage 148 and the passage 118 is again connected to the pilot pressure through the passage 114 whereby the spool valve 119 is shifted to the right to the position of FIG. 13. This prevents any further fluid flow to one of the rack pistons 40 and 41 and exhaust from the other. Of course, they have completed their movement previously in the direction in which the arms 27 and 28 were returned to the position of FIG. 2.

With the solenoid 110 still energized, the pistons 52, 53, 57, and 58 are held in the position of FIG. 13. The positions of the pistons 52, 53, 57, and 58 can be changed only when the solenoid 110 is de-energized and the solenoid 109 is again energized. When this occurs, the cycle again repeats itself in the same manner as has previously been described.

A pressure switch 155 can be connected to the spool valve 119 to indicate when the spool valve 119 is in the position of FIG. 13. Thus, the pressure switch 155 is activated only when pressure is supplied to the left side of the spool valve 119.

When this occurs, the piston 52 must be in its upper position. This is because the reduced portion 116 of the piston 52 must allow the passage 115 and 117 to communicate with each other. Therefore, the pressure switch 155 also indicates that the piston 52 is in its upper position.

The pressure switch 155 is activated by being connected through a line 155a with the line 118' when the spool valve 119 is in the position of FIG. 13. When the spool valve 119 is moved to the left in FIGS. 5 and 13, the line 155a communicates with a line 155b to the pilot exhaust rather than with the line 118' whereby the pressure switch 155 is inactivated.

A pressure switch 156 is connected to the passage 128 through a passage 157 and to the passage 147 when the piston 57 is in its upper position. At this time, a reduced portion 158 of the piston 57 allows passages 159 and 160 in the lower sleeve 67 to communicate with each other.

The passage 159 is connected to the passage 157 while the passage 160 is connected to the passage 147 whereby the pressure switch 156 is connected to the passage 147 when the piston 57 is in its upper position. Therefore, when the pressure switch 156 is inactivated, this indicates that the piston 57 is in its upper position.

A pressure switch 161 is employed to indicate the position of the piston 58. Thus, when the piston 58 is in its upper position, the pressure switch 161 is activated because a passage 162, which has the pressure switch 161 connected thereto, is connected to a passage 163, which has the pilot pressure connected thereto, in the housing 31.

When the piston 58 is in its upper position, a reduced portion 164 of the piston 58 allows passages 165 and 166 in the lower sleeve 69 to communicate with each other. Since the passage 165 is connected to the passage 162 and the passage 166 is connected to the passage 163, the pilot pressure may be supplied to the passage 162 to activate the pressure switch 161.

When the piston 58 is in its lower position, the passage 162 is connected to a pilot exhaust passage 167 in the housing 31. In its lower position, a reduced portion 168 of the piston 58 allows passages 169 and 170 in the upper sleeve 68 to communicate with each other. Since the passage 170 is connected through a passage 171 to the passage 162 and the passage 169 is connected to the passage 167, the passage 162 is in communication with the pilot exhaust. Accordingly, the pressure switch 161 is inactivated to indicate that the piston 58 is in its lower position.

While the pistons 52, 53, 57, and 58 have been shown and described as being moved simultaneously in both the up and down directions since a sequential operation is to occur, it should be understood that the pistons 57 and 58 can be moved independently of the pistons 52 and 53 when the tools are not used in sequence but in a random access operation. This will enable independent control of the pistons 57 and 58 whereby the arm 27 and 28 can move the tool into or out of the pocket 26 of the tool carrier 24 at a different time than when the tool is moved into the spindle 22.

It is necessary that the arm 27 or 28, which moves the tool into or out of the pocket 26, be capable of independent movement since the tool is not returned to the same pocket 26 from which the tool was removed for disposition in the spindle 22. Thus, the arm, which is to insert the tool 25 into the pocket 26 of the tool carrier 24, must be parked in the phantom line position of FIG. 2 until the tool carrier 24 has been driven sufficiently to dispose the pocket 26, which is to receive the tool, at the tool change position.

While the parking of the arm, which supports the tool 25 that is to be disposed in the pocket 26, is necessary when the tool 25 is to be inserted into the pocket 26, parking of the arm also might be desirable when one of the tools 25 is to be removed from the pocket 26 in the tool carrier 24. Thus, this independent control of the pistons 57 and 58 enables the tool 25, which is in the pocket 26 and is to be moved to the spindle 22, to be removed prior to any activation of the arm, which removes the tool 25 from the spindle 22. Thus, because of the shorter stroke length of the pistons 52 and 53, this movement of the pistons 57 and 58 earlier than the pistons 52 and 53 could increase the speed of operation of changing one of the tools for another in the spindle 22.

The independent control of the pistons 57 and 58 in each direction is accomplished by using a plug 172 (see FIG. 13) in a line 173, which connects the line 113 with the upper surfaces of the pistons 57 and 58. A plug 174 is employed in a line 175, which connects the line 141 with the lower surfaces of the pistons 57 and 58.

The plugs 172 and 174 are schematically shown in FIG. 13 as being in the operative position in which they would actually not be employed. When employed, the plugs 172 and 174 prevent any fluid from the lines 113 and 141, respectively, from flowing to actuate the pistons 57 and 58.

When the plugs 172 and 174 are employed, it is necessary to remove a second plug 176 in the line 173, which is connected to a control valve 177, and a second plug 178 in the line 175, which also is connected to the valve 177. When the plugs 172 and 174 are employed to block the flow from the lines 113 and 141, the plugs 176 and 178 must be removed to allow communication through the lines 173 and 175 from the valve 177.

When the valve 177 is in the position of FIG. 13, a solenoid 179 is de-energized, and a spring 180 holds the valve 177 in the position of FIG. 13. In this position, the line 175 communicates with the fluid pressure while the line 173 is exhausted. Therefore, when the solenoid 179 is de-energized, the pistons 57 and 58 are held in their upper positions and have been moved thereto due to the solenoid 179 being de-energized.

When it is desired to move the pistons 57 and 58 downwardly, the solenoid 179 is energized. This reverses the fluid connections to the lines 173 and 175 whereby fluid is supplied to act on the upper surfaces of the pistons 57 and 58 and is exhausted from beneath the lower surfaces of the pistons 57 and 58. This moves the pistons 57 and 58 downwardly.

Accordingly, when it is desired to pivot the arm 27 or 28 away from the pocket 26, the solenoid 179 is energized to move the pistons 57 and 58 downwardly. The arm 27 or 28, which is controlled by the pistons 57 and 58, can be moved downwardly either before or after the arm 27 or 28, which is controlled by the pistons 52 and 53, is pivoted.

Because of the requirement for both the pistons 53 and 57 to be in their lower position for pilot pressure to be supplied through the line 133 to the right side of the spool valve 119, there can be no indexing of the head 33 until both of the arms 27 and 28 have completed their pivoting away from the solid line positions of FIG. 2 to the phantom line positions. The index head 33 is automatically rotated 180° after both of the arms 27 and 28 have completed their pivotal movement because all of the pistons 52, 53, 57, and 58 are in their lower positions at this time.

The completion of rotation of the index head 33 automatically results in the spool valve 112 having its position shifted whereby the fluid pressure is supplied to act on the lower surfaces of the pistons 52 and 53 to move them upwardly and return the arm 27 or 28, which is controlled by the pistons 52 and 53, to a position adjacent the spindle 22. Thus, if the arm 28 was initially in the position of FIG. 2, the arm 27 would now be moved to the position adjacent the spindle 22.

The pistons 57 and 58 are not moved upwardly until the solenoid 179 is de-energized. This can occur at any selected time. When it occurs, the arm 27 or 28, which is controlled by the pistons 57 and 58, is pivoted to a position adjacent the pocket 26 depending upon the initial positions of the arms 27 and 28. If the arm 27 was disposed initially adjacent the pocket 26, the arm 28 would now be pivoted adjacent the pocket 26.

Accordingly, selected movement of the pistons 57 and 58 can occur independently of the pistons 52 and 53. Thus, the arms 27 and 28 are controlled independently from each other. However, there can be no indexing of the head 33 to rotate the arms 27 and 28 from one of their positions to the other until both are in their phantom line positions of FIG. 2.

If the pistons 57 and 58 are moved downwardly before the pistons 52 and 53, the pressure switch 156 would be activated to indicate that the piston 57 is in its lower position since the passage 128 has the pilot pressure therein. While the pistons 52 and 53 must move upwardly when rotation of the index head 33 is completed, the pressure switch 156 is inactivated only when the piston 57 is in its upper position.

While the present invention has described the operation as being under the control of a numerical control apparatus, it should be understood that such is not a requisite for operation of the tool changing mechanism of the present invention. Thus, all of the various operations could be manually performed if desired.

An advantage of this invention is that a tool can always be returned to the same stored position in a tool storage mechanism. Another advantage of this invention is that a simplified clamping mechanism for the tool is provided. Still another advantage of this invention is that a tool may be easily transferred from the tool storage mechanism to another gripping mechanism which is separate from the tool changing mechanism.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An interchanger for use with a machine tool having a rotatable spindle and tool storage means remote from the spindle including:
   a housing;
   a shaft rotatably mounted in said housing for rotation about its longitudinal axis;
   means to rotate said shaft between first and second positions;
   a pair of arms;

first means to mount said arms for rotation with said shaft, said first mounting means maintaining said arms at the same angular relation to each other about the axis of rotation of said shaft during rotation of said shaft;

each of said arms having clamping means to releasably connect a tool to said arm;

second means mounting each of said arms on said first mounting means for movement relative thereto;

first moving means to move one of said arms between first and second positions when said rotating means is in its first position to move a tool connected to said one arm into or out of the tool storage means and to move the other of said arms between the same first and second positions when said rotating means is in its second position to move a tool connected to said other arm into or out of the tool storage means;

second moving means, separate from said first moving means, to move said other arm between first and second positions when said rotating means is in its first position to move a tool connected to said other arm into or out of the spindle and to move said one arm between the same first and second positions when said rotating means is in its second position to move a tool connected to said one arm into or out of the spindle;

and means to control movement of said first and second moving means.

2. The interchanger according to claim 1 in which said second mounting means includes means to pivotally mount each of said arms on said first mounting means.

3. The interchanger according to claim 2 in which said control means includes means to simultaneously move said first and second moving means to pivot both of said arms simultaneously from at least one of the first and second positions to the other.

4. The interchanger according to claim 3 in which said control means includes means to move each one of said first and second moving means independently of the other of said first and second moving means to pivot each one of said arms independently of the other of said arms from the other of the first and second positions to the one of the first and second positions.

5. The interchanger according to claim 2 in which said control means includes means to simultaneously move said first and second moving means to pivot both of said arms simultaneously between the first and second positions.

6. The interchanger according to claim 2 in which said control means includes means to move each one of said first and second moving means independently of the other of said first and second moving means to pivot each one of said arms independently of the other of said arms between first and second positions.

7. The interchanger according to claim 1 in which said control means includes means to simultaneously move said first and second moving means to move both of said arms simultaneously at least from one of the first and second positions to the other.

8. The interchanger according to claim 7 in which said control means includes means to move each one of said first and second moving means independently of the other of said first and second moving means to move each one of said arms independently of the other of said arms from the other of the first and second positions to the one of the first and second positions.

9. The interchanger according to claim 1 in which said control means includes means to simultaneously move said first and second moving means to move both of said arms simultaneously between the first and second positions.

10. The interchanger according to claim 1 in which said control means includes means to move each one of said first and second moving means independently of the other of said first and second moving means to move each one of said arms independently of the other of said arms between the first and second positions.

11. The interchanger according to claim 1 including means to control each one of said clamping means separately of the other of said clamping means in accordance with the position of said arm having said clamping means.

12. The interchanger according to claim 1 including:

at least two tool gripping means supported by each of said arms;

means to mount one of said tool gripping means for disposition in a continuous annular groove in the surface of a flange of the tool to be gripped and at least one other of said tool gripping means for disposition in a continuous annular groove in another flange of the tool to be gripped with the flanges longitudinally spaced from each other and the grooves being in the surfaces of the flanges closest to each other;

means to pivotally support only said one tool gripping means;

means cooperating with said pivotally supporting means to move said one tool gripping means in response to one of said first and second moving means being activated to cause said tool gripping means to move into the grooves;

and resilient means to retain said one tool gripping means in the groove in which it is disposed.

13. An interchanger for use with a machine tool having a rotatable spindle and tool storage means remote from the spindle including:

a housing;

a shaft rotatably mounted in said housing for rotation about its longitudinal axis;

means to rotate said shaft between first and second positions;

a pair of arms;

first means to mount said arms for rotation with said shaft;

each of said arms having clamping means to releasably connect a tool to said arm;

second means mounting each of said arms on said first mounting means for movement relative thereto to move tools into and out of the spindle and the tool storage means;

said clamping means including:

at least two gripping means supported by each of said arms;

means to mount one of said tool gripping means for disposition in a continuous annular groove in the surface of a flange of a tool to be gripped and at least one other of said tool gripping means for disposition in a continuous annular groove in another flange of the tool to be gripped with the flanges axially spaced from each other and the grooves being in the surfaces of the flanges closest to each other;

means to pivotally support only said one tool gripping means;

means cooperating with said pivotally supporting means to pivot said one tool gripping means to cause said tool gripping means to move into the grooves when a tool is to be connected to said arm for movement therewith between the spindle and the tool change position when said shaft is rotated and out of the grooves when the connected tool is to be released for disposition in one of the spindle and the storage means;

and resilient means to retain said one tool gripping means in the grooves in which it is disposed;

means to control movement of each of said arms;

and said cooperating means of said clamping means being movable by said control means when said tool gripping means are to be moved into and out of the grooves in coordination with movement of said arms by said control means.

14. The interchanger according to claim 13 in which:

said control means includes separate means to move each of said arms;

and each of said cooperating means is movable by a corresponding one of said separate moving means.

* * * * *